(12) United States Patent
Cubala et al.

(10) Patent No.: US 9,195,020 B2
(45) Date of Patent: Nov. 24, 2015

(54) SPLICE TRAY RAIL SYSTEM

(75) Inventors: Rich Cubala, Greer, SC (US); Craig Henderson, Woodruff, SC (US)

(73) Assignee: AFL Telecommunications LLC, Duncan, SC (US)

( * ) Notice: Subject to any disclaimer, the term of this patent is extended or adjusted under 35 U.S.C. 154(b) by 135 days.

(21) Appl. No.: 13/812,320

(22) PCT Filed: Sep. 10, 2012

(86) PCT No.: PCT/US2012/054391
§ 371 (c)(1),
(2), (4) Date: Jan. 25, 2013

(87) PCT Pub. No.: WO2013/036905
PCT Pub. Date: Mar. 14, 2013

(65) Prior Publication Data
US 2013/0188919 A1    Jul. 25, 2013

Related U.S. Application Data

(60) Provisional application No. 61/532,618, filed on Sep. 9, 2011.

(51) Int. Cl.
*G02B 6/44* (2006.01)
*G02B 6/46* (2006.01)

(52) U.S. Cl.
CPC ............ *G02B 6/4439* (2013.01); *G02B 6/4455* (2013.01); *Y10T 29/49826* (2015.01)

(58) Field of Classification Search
CPC ....... G02B 6/4442; G02B 6/4455; G02B 6/44

USPC ......................................................... 385/135
See application file for complete search history.

(56) References Cited

U.S. PATENT DOCUMENTS

| | | | |
|---|---|---|---|
| 4,927,227 A * | 5/1990 | Bensel et al. | 385/135 |
| 5,323,480 A | 6/1994 | Mullaney et al. | |
| 5,481,639 A * | 1/1996 | Cobb et al. | 385/135 |
| 5,946,440 A | 8/1999 | Puetz | |
| 6,434,313 B1 | 8/2002 | Clapp, Jr. et al. | |
| 7,200,314 B2 | 4/2007 | Womack et al. | |
| 2009/0245743 A1 | 10/2009 | Cote et al. | |
| 2011/0097051 A1 | 4/2011 | Vermeulen et al. | |
| 2011/0135267 A1 | 6/2011 | Barker et al. | |

FOREIGN PATENT DOCUMENTS

WO    02/21182 A1    3/2002

OTHER PUBLICATIONS

International Search Report for PCT/US2012/054391 dated Dec. 7, 2012.

* cited by examiner

*Primary Examiner* — Michelle R Connelly
(74) *Attorney, Agent, or Firm* — Sughrue Mion, PLLC (57) ABSTRACT

A splice tray rail system includes a splice tray assembly which includes a splice tray and a tray holder and a rail having a first portion and the second portion. The splice tray assembly is disposed in a first direction when the splice tray is engaged with the first portion of the rail, and the splice tray assembly is disposed in a second direction when the splice tray is engaged with the second portion of the rail.

14 Claims, 8 Drawing Sheets

SPLICE TRAY RAIL SYSTEM

CROSS-REFERENCE TO RELATED APPLICATIONS

This application is based upon and claims priority from U.S. Provisional Application No. 61/532,618, filed Sep. 9, 2011, the disclosure of which is incorporated herein by reference in their entirety.

BACKGROUND

1. Field

Apparatuses and methods consistent with the exemplary embodiments relate to a multiple splice installation system and method of using thereof, and more particularly, a multiple splice installation system which is capable of securing the trays and preventing damage from occurring to the splice trays and optical fibers disposed therein.

2. Related Art

There are two common techniques used to install multiple splice trays in a splice closure or enclosure: 1. Hinged splice trays and 2. Strapped splice trays.

For hinged splice trays, the splice trays have integral hinge features that connect the splice trays to each other or connect the splice trays to a backbone hinge plate. Using either technique, the splice trays are designed to pivot about the axis defined by the hinges. Although the technique of using hinges can be effective, it also has some limitations. Specifically, it can be difficult to insert new splice trays into a pre-existing stack of splice trays or remove an installed splice tray from a pre-existing stack of the splice trays. Additionally, since the hinge is typically physically close to the edge of the splice tray, it can be difficult for many field technicians to access the interior of a splice tray due to interference with the bottom surface of a lifted splice tray.

On the other hand, for strapped splice trays, the splice trays are physically stacked onto a base plate and a strap is used to hold the splice trays in place. Often, a key feature is used to prevent the stacked splice trays from moving out of position due to the torque applied by cable subunits. Although the technique of using straps has its advantages, the technique also has some limitations. Specifically, when field technicians are required to access a specific splice tray in a stack of the splice trays, all retaining straps must be removed, thereby allowing all splice trays to move and risking possible fiber bending. Additionally, other features must be added to a splice closure or enclosure to store the splice trays when access is needed.

The current invention addresses the above noted shortcomings of hinged splice trays and strapped splice trays.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

Accordingly, aspects of one or more exemplary embodiments may be achieved by providing a splice tray rail system includes a splice tray assembly which includes a splice tray and a tray holder and a rail having a first portion and the second portion. The splice tray assembly is disposed in a first direction when the splice tray is engaged with the first portion of the rail, and the splice tray assembly is disposed in a second direction when the splice tray is engaged with the second portion of the rail.

Another embodiment of a splice tray rail system of the above embodiment may have the first direction and the second direction being different.

Another embodiment of a splice tray rail system of the above embodiment may have the first portion and the second portion being substantially perpendicular from each other.

Another embodiment of a splice tray rail system of the above embodiment may have the first position being a horizontal position and the second position being a vertical position.

Another embodiment of a splice tray rail system of the above embodiment the tray holder including a rail slot which engages with the rail; a first tray guide having a notch which secures the splice tray assembly; a second tray guide having a snap which secures the splice tray assembly; and a flexible snap mechanism which allows the second tray guide to bend away from a holder base of the tray holder.

Another embodiment of a splice tray rail system of the above embodiment may have the splice tray having a snap slot which engages with the snap.

Another embodiment of a splice tray rail system of the above embodiment may have the snap extended in a substantially parallel direction with the holder base of the tray holder.

Another embodiment of a splice tray rail system of the above embodiment may have the second portion having locking slots where the splice tray assembly is disposed in the second direction when the splice tray is engaged with a locking slot of the second portion of the rail.

A method of securing a splice tray assembly having a rail slot includes: providing a rail having a first portion and a second portion; placing a first splice tray assembly extending in a first direction at the first portion of the rail; placing a second splice tray assembly extending in the first direction at the first portion of the rail on top of the first splice tray; and transferring the first splice tray assembly to the second portion of the rail, where the first splice tray assembly extends in a second direction.

Another embodiment of the above method may have the first direction and the second direction being different.

Another embodiment of the above method may have the first portion and the second portion substantially perpendicular from each other.

Another embodiment of the above method may have the first position being a horizontal position and the second position being a vertical position.

Another embodiment of the above method may further include a step of providing the splice tray assembly having a splice tray and a tray holder.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

Figure 1A:
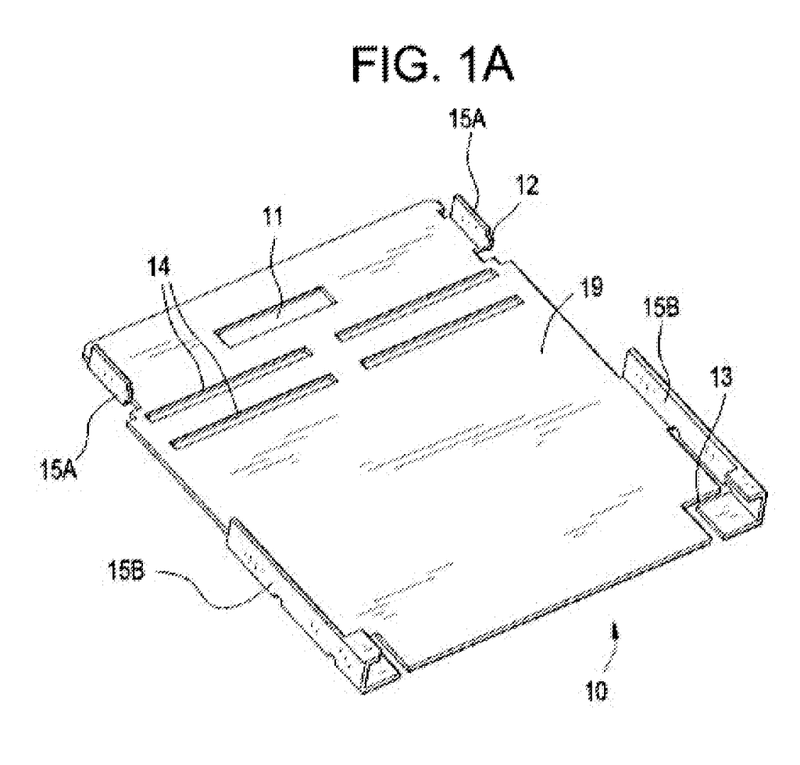
FIG. 1A shows a perspective view of an exemplary embodiment of a tray holder.

FIG. 1A shows a perspective view of an exemplary embodiment showing a tray holder 10. As shown in FIG. 1A, the tray holder 10 includes a holder base 19 and first tray guides 15A and second tray guides 15B that are substantially perpendicular to the holder base 19. The first tray guides 15A include stops 12 which are notches made on the bottom portion of the first tray guides 15A. Each of two sides of the holder base 19 includes first tray guides 15A and a second tray guide 15B and the two sides are disposed opposite from each other. That is, the sides of the holder base 19 which include the first tray guide 15A and the second tray guide 15B are substantially parallel from each other. The holder base 19 includes a rail slot 11 which allows the tray holder 10 to be engaged with a rail system 20 shown in FIG. 2 and also includes tie-wrap slots 14 which provide access to optical fibers (not shown) disposed in a splice tray 50 as shown in FIG. 3A. The holder base 19 also includes flexible snap mechanisms 13 which allow the second tray guides 15B to be elastically bent in different directions such that a splice tray 50 can be slid into a position where the tray holder 10 and the splice tray 50 can be engaged or disengaged. For example, the second tray guides 15B can be elastically bent away from each other in the horizontal direction.

Figure 1B:
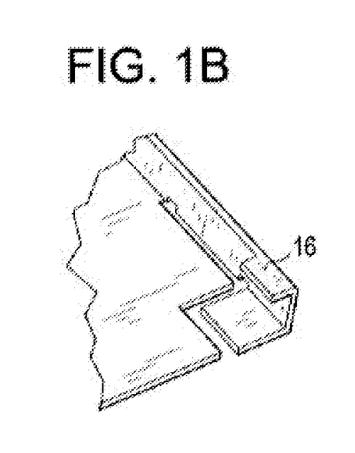
FIG. 1B shows an enlarged view of a snap of a tray holder for locking a splice tray in place.

FIG. 1B shows an enlarged view of a snap 16 of a tray holder 10 for locking a splice tray 50 in place. The snap 16 is disposed on second tray guides 15B and extends substantially parallel with a holder base 19. More details of how the snap 16 of the tray holder 10 engages with a splice tray 50 will be described with FIGS. 3A and 3B.

Figure 2:
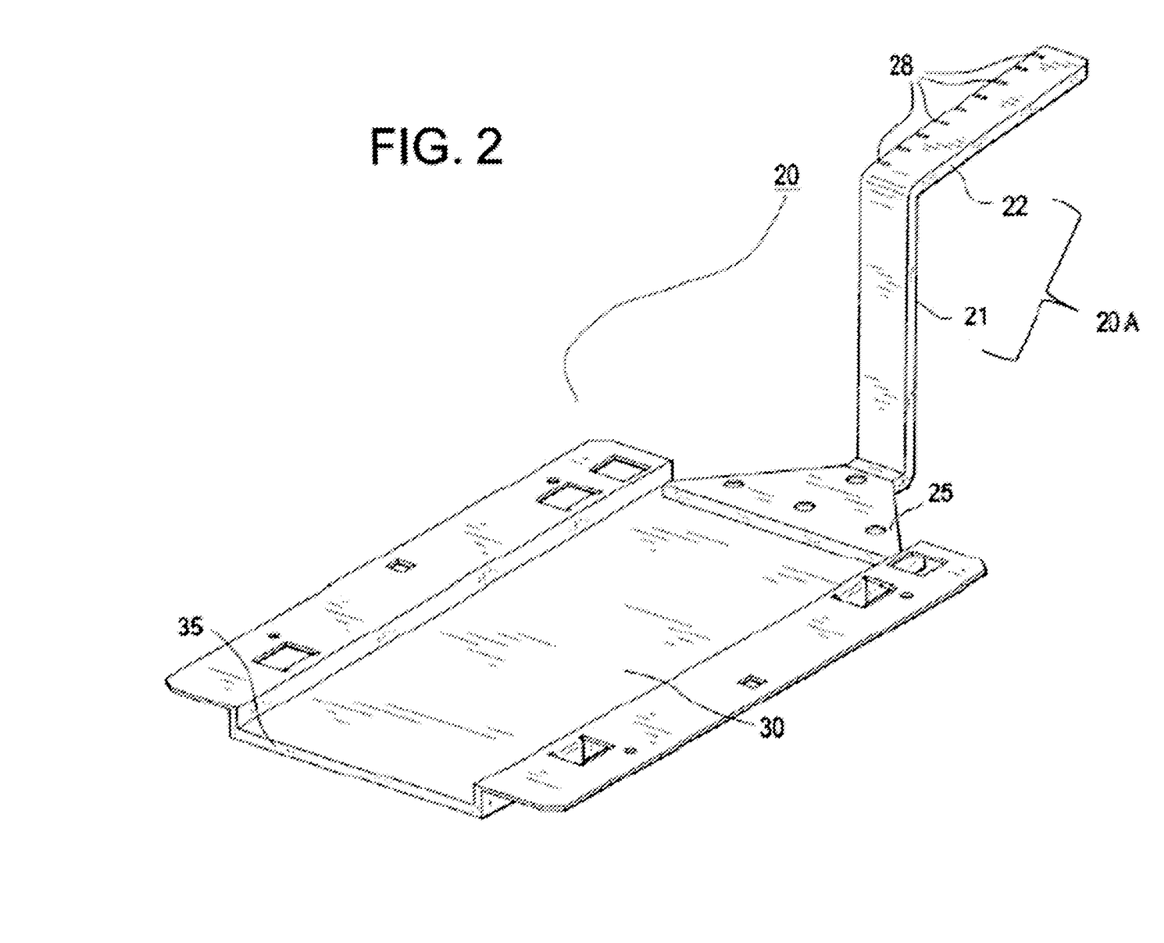
FIG. 2 shows a perspective view of an exemplary embodiment of a rail system which includes a rail, a rail base and a base plate.
Figures 3A, 3B:
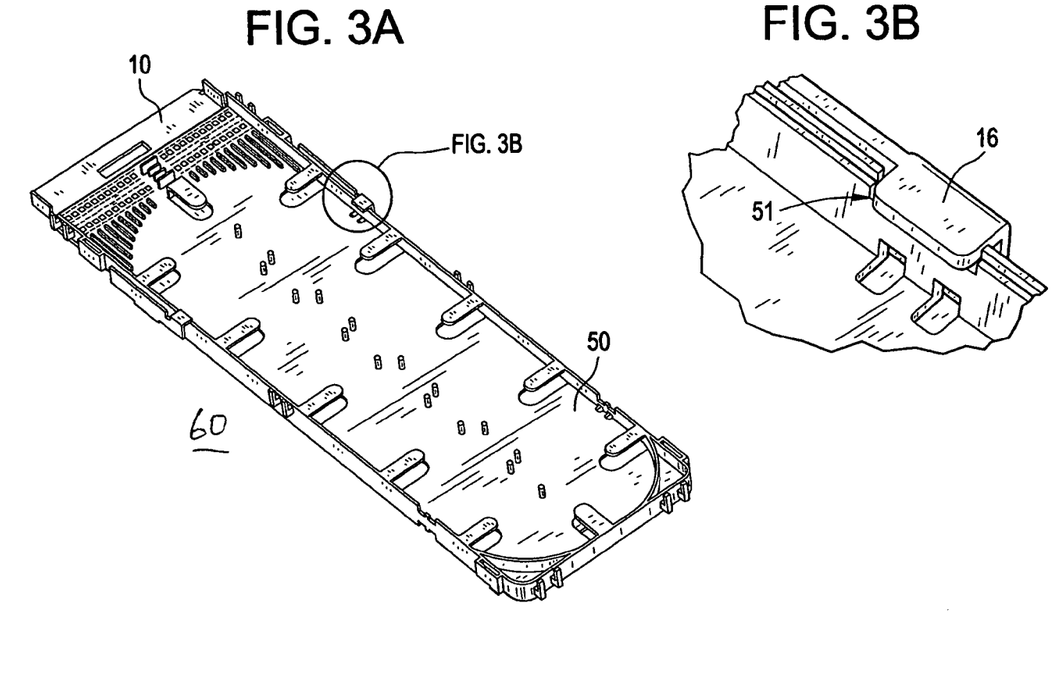
FIG. 3A shows a perspective view of an exemplary embodiment of a splice tray attached to a tray holder forming a splice tray assembly.
FIG. 3B shows an enlarged view of an attachment between a snap slot of a splice tray assembly.

FIG. 2 shows a perspective view of an exemplary embodiment showing a rail system 20 which includes a rail 20A, a rail base 25 and a base plate 30. The rail 20A includes a first portion 21 which is substantially perpendicular from the rail base 25 and the base plate 30 and a second portion 22 which substantially extends parallel with the rail base 25 and the base plate 30. The second portion 22 of rail 20A includes locking slots 28 along the length of the second portion 22 of the rail 20A. The locking slots 28 have a width which is the same as a thickness of a holder base 19 of a tray holder 10 and have a depth which is less than a width of the second portion 22 of the rail 20A. As shown in FIG. 2, the width of the locking slots 28 is substantially perpendicular from the width of the second portion 22 of the rail 20A. The base plate 30 is attached to the rail base 25 through rivets and includes a raised portion 35 which supports splice trays 50.

FIG. 3A shows a perspective view of an exemplary embodiment showing a splice tray 50 attached to a tray holder 10 forming a splice tray assembly 60. The splice tray assembly 60 is formed when the splice tray 50 is slid into the tray holder 10. As discussed, the flexible snap mechanisms 13 allows the second tray guides 15B to elastically bend and create a wider width for a rail side end 55 of the splice tray 50 to slide into stops 12 of the first tray guides. Once the rail side end 55 of the splice tray 50 is secured at the stops 12 of the first tray guides, the second tray guides 15B are returned to an original position and the snaps 16 of the second tray guides are snapped into a snap slots 51 of the splice tray 50 as shown in FIG. 3B.

Conversely, when the splice tray 50 needs to be detached from the tray holder 10, the similar steps can be used. For example, the second tray guides 15B are elastically bent and the snaps 16 are detached from the snap slots 51 of the splice tray 50. Then, the bending of the second tray guides 15B creates a wider width for the rail side end 55 of the splice tray 50 to slide out of the stops 12 of the first tray guides 15A thereby detaching the splice tray 50 from the tray holder 10.

Figure 4:
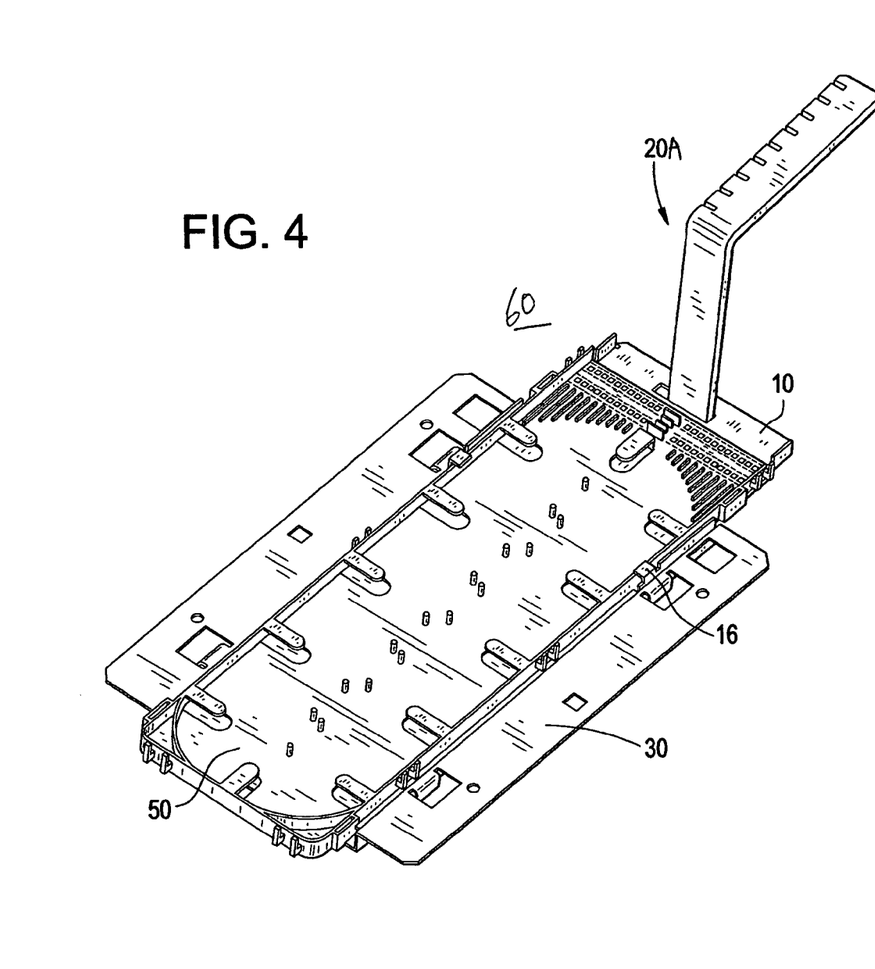
FIG. 4 shows a perspective view of an exemplary embodiment of a splice tray assembly engaged with a rail system.

FIG. 4 shows a perspective view of an exemplary embodiment showing a splice tray assembly 50 engaged with a rail system 20. The splice tray assembly 60 or the tray holder 10 can engage with the rail system 20 by placing a rail slot 11 of the tray holder 10 through an end of the second portion 22 of the rail 20A. Consequently, the splice tray assembly 60 or the tray holder 10 can ride along the length of the first and second portions 21 and 22 of the rail 20A and can be disposed on top of the base plate 30 as shown in FIG. 4.

Figure 5:
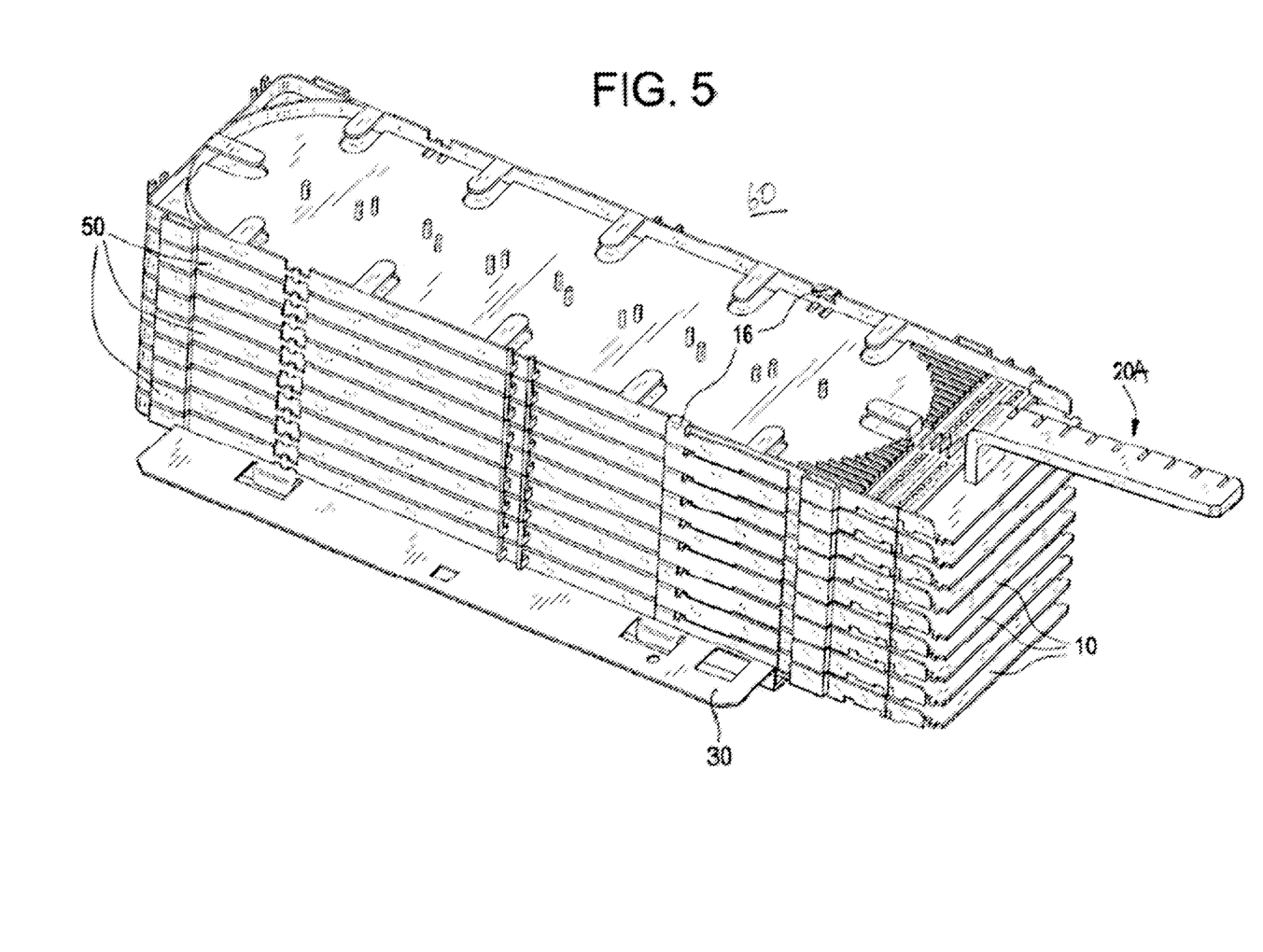
FIG. 5 shows a perspective view of an exemplary embodiment of a stacked multiple of splice tray assemblies engaged with a rail system.

FIG. 5 shows a perspective view of an exemplary embodiment showing a stacked splice tray assemblies 60 engaged with a rail system 20. Although the exemplary embodiment of FIG. 5 shows nine (9) splice tray assemblies, depending on a length of the overall rail including the first 21 and the second portion 22 of the rail 20A and thickness of the splice tray assemblies 60, a number of splice tray assemblies 60 can be engaged with the rail system 20.

Figure 6A:
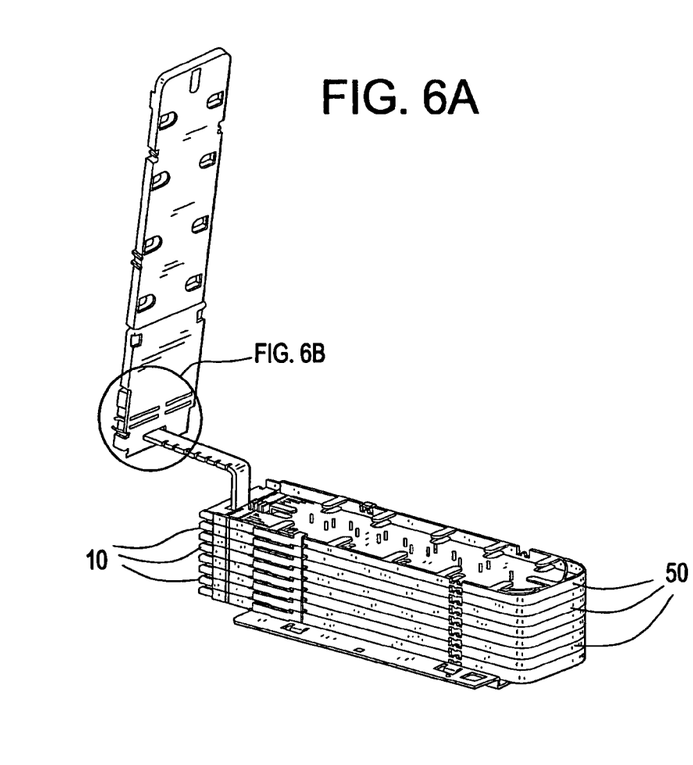
FIG. 6A shows a perspective view of an exemplary embodiment of a splice tray assembly disposed in a substantially vertical position.
Figure 6B:
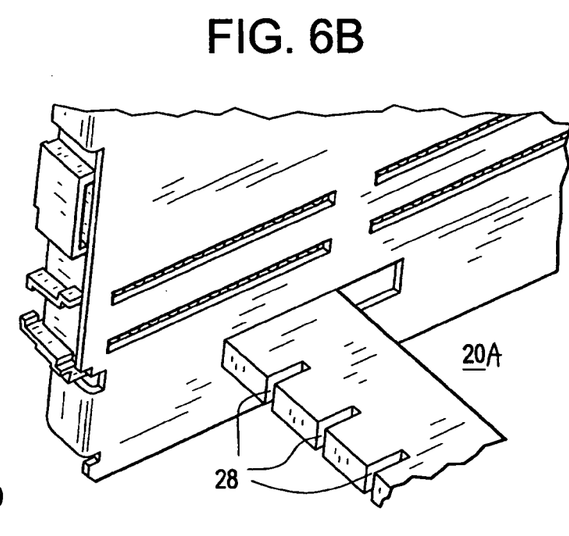
FIG. 6B shows an enlarged view of a locked assembly between a splice tray assembly and a horizontal portion of a rail.

FIG. 6A shows a perspective view of an exemplary embodiment showing a splice tray assembly 60 disposed in a substantially vertical position and FIG. 6B shows an enlarged view of a locked assembly between a splice tray assembly 60 and a second portion 22 of a rail 20A. When a field technician is required to work on a splice tray 60 which is sandwiched between other splice trays 60, there is a risk of damaging fibers if the splice tray is removed. Thus, as shown in FIG. 6A, for example, if the field technician is required to work on the second splice tray, the splice tray disposed on top of the second splice tray can be transferred from the first portion 21 of the rail 20A to the second portion 22 of the rail 20A.

As shown in FIG. 6B, the splice tray assembly 60 can be slid into one of various locking slots 28 and held in a vertical position. Even though the instant exemplary embodiment discloses the splice tray assembly held in the vertical direction, one of ordinary skill in the art can modify the rail system 20 and the rail slot 11 of the splice tray assembly such the splice tray assembly can be held in various positions. As long as the field technician can access a splice tray which is not easily accessible without creating the risk of damaging the fiber optic fibers, any rail system and the splice tray assembly design can be used.

Figures 7A, 7B, 7C:
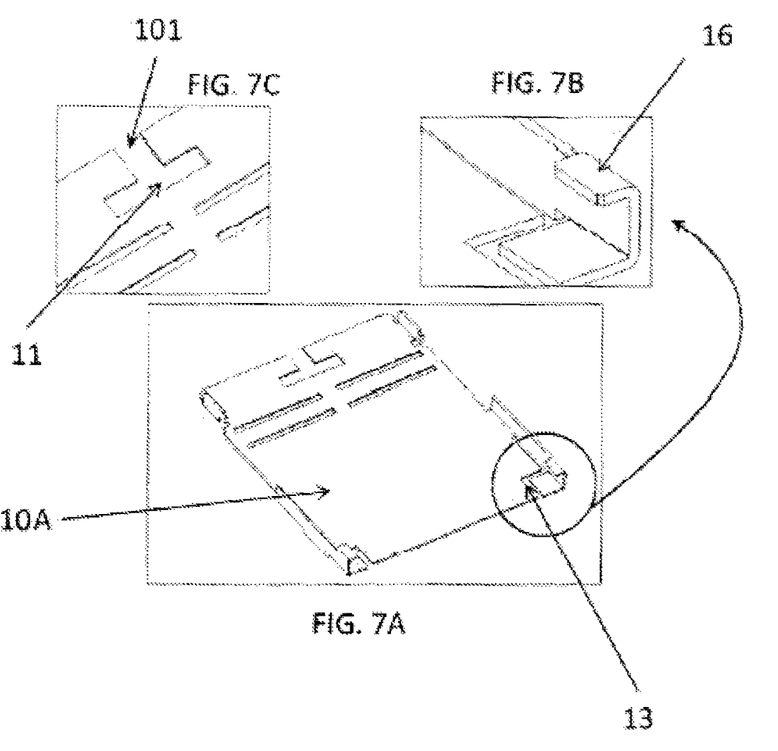
FIGS. 7A-7C shows a perspective view of another exemplary embodiment of a tray holder with a pivot slot.

FIGS. 7A-7C shows a perspective view of another exemplary embodiment of a tray holder 10A with a pivot slot 101. The holder tray 10A shown in FIGS. 7A-7C is identical with the tray holder shown in FIG. 1 except that the tray holder 10A has the pivot slot 101 connected to the rail slot 11.

Figure 8:
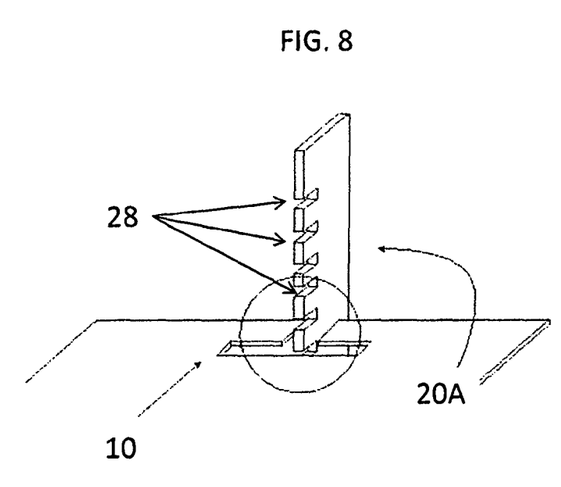
FIG. 8 shows a perspective view of an exemplary embodiment where a tray holder with a pivot slot is pivoted onto a rail system.

FIG. 8 shows a perspective view of an exemplary embodiment where a tray holder 10A with a pivot slot 101 is pivoted onto a rail 20A of a rail system 20. Before a splice tray 50 is attached to the tray holder 10A, the tray holder 10A may be pivoted onto the rail thereby allowing more flexibility when installing between existing tray holders 10A. The splice tray 50 then can be attached to the tray holder 10A. The pivot slot 101 may need to be larger for pivoting onto the rail 20A.

The configuration shown in the exemplary embodiments minimizes the movement of the optical fibers or cable subunits within a splice closure. The splice installation system disclosed in the exemplary embodiments provides an easy way to insert or remove splice tray from splice tray stack. Also, when splice tray assemblies are moved along rail to access a specific splice tray, all splice tray assemblies are securely held and it provides room to access the interior of this splice tray is greater than in hinged tray design. Further, the rail system 20 can be generalized to accept many different splice tray designs concurrently.

Although a few exemplary embodiments have been shown and described, it will be appreciated by those skilled in the art that changes may be made in these exemplary embodiments without departing from the principles and spirit of the invention, the scope of which is defined in the appended claims and their equivalents. The exemplary embodiments should be considered in a descriptive sense only and not for purposes of limitation.

What is claimed is:

1. A splice tray rail system comprising:
    a splice tray assembly comprising:
        a splice tray;
        a tray holder; and
        a rail having a first portion and a second portion,
    wherein the splice tray assembly is disposed in a first direction when the splice tray and tray holder are engaged with the first portion of the rail, and the splice tray assembly and tray holder are disposed in a second direction when the splice tray is engaged with the second portion of the rail, and
    the tray holder comprises:
    a rail slot which engages with the rail;
    a first tray guide having a notch which secures the splice tray assembly;
    a second tray guide having a snap which secures the splice tray assembly; and
    a flexible snap mechanism which allows the second tray guide to bend away from a holder base of the tray holder.

2. The splice tray rail system of claim 1, wherein the first direction and the second direction are different.

3. The splice tray rail system of claim 2, wherein the first portion and the second portion are substantially perpendicular from each other.

4. The splice tray rail system of claim 3, wherein the first portion is a horizontal position and the second portion is a vertical position.

5. The splice tray rail system of claim 1, wherein the splice tray comprises a snap slot which engages with the snap.

6. The splice tray rail system of claim 5, wherein the snap extends in a parallel direction with the holder base of the tray holder.

7. The splice tray rail system of claim 1, wherein the second portion comprises locking slots,
    wherein the splice tray assembly is disposed in the second direction when the splice tray is engaged with a locking slot of the second portion of the rail.

8. The splice tray rail system of claim 1, wherein the tray holder is smaller than the splice tray.

9. The splice tray rail system of claim 1, wherein the splice tray is rectangular and has two longs sides and two short sides which are each shorter than either of the long sides,
    the notch of the tray holder is configured to connect to one of the short sides of the splice tray, and
    the snap of the tray holder is configured to connect to one of the long sides of the splice tray.

10. A method of securing a splice tray assembly having a rail slot, the method comprising:
    providing a rail having a first portion and a second portion;
    placing a first splice tray assembly, comprising a first splice tray and a first tray holder, extending in a first direction at the first portion of the rail;
    placing a second splice tray assembly, comprising a second splice tray and a second tray holder, extending in the first direction at the first portion of the rail on top of the first splice tray;
    transferring the first splice tray assembly to the second portion of the rail, and
    engaging the first splice tray assembly with one of a plurality of locking slots of the second portion of the rail,
    wherein the first splice tray assembly extends in a second direction.

11. The method of claim 10, wherein the first direction and the second direction are different.

12. The method of claim 10, wherein the first portion and the second portion are substantially perpendicular from each other.

13. The method of claim 10, wherein the first position is a horizontal position and the second position is a vertical position.

14. A splice tray rail system comprising:
    a splice tray assembly comprising:
        a splice tray;
        a tray holder; and
        a rail having a first portion and a second portion,
    wherein the splice tray assembly is disposed in a first direction when the splice tray is engaged with the first portion of the rail, and the splice tray assembly is disposed in a second direction when the splice tray is engaged with the second portion of the rail,
    wherein the second portion comprises locking slots, and
    wherein the splice tray assembly is disposed in the second direction when the splice tray is engaged with a locking slot of the second portion of the rail.

* * * * *